(12) United States Patent
Ogiwara et al.

(10) Patent No.: US 10,076,083 B2
(45) Date of Patent: Sep. 18, 2018

(54) PLANT CULTIVATION METHOD

(71) Applicant: NATIONAL UNIVERSITY CORPORATION TOKYO UNIVERSITY OF AGRICULTURE AND TECHNOLOGY, Tokyo (JP)

(72) Inventors: Isao Ogiwara, Tokyo (JP); Jingai Che, Tokyo (JP); Naomi Horiuchi, Tokyo (JP); Takuya Murakami, Tokyo (JP); Saori Sekiguchi, Tokyo (JP)

(73) Assignee: NATIONAL UNIVERSITY CORPORATION TOKYO UNIVERSITY OF AGRICULTURE AND TECHNOLOGY, Tokyo (JP)

( * ) Notice: Subject to any disclaimer, the term of this patent is extended or adjusted under 35 U.S.C. 154(b) by 214 days.

(21) Appl. No.: 14/778,666

(22) PCT Filed: Mar. 20, 2014

(86) PCT No.: PCT/JP2014/057716
§ 371 (c)(1),
(2) Date: Sep. 21, 2015

(87) PCT Pub. No.: WO2014/156939
PCT Pub. Date: Oct. 2, 2014

(65) Prior Publication Data
US 2016/0044871 A1 Feb. 18, 2016

(30) Foreign Application Priority Data

Mar. 25, 2013 (JP) ................................. 2013-062060
Sep. 20, 2013 (JP) ................................. 2013-194961

(51) Int. Cl.
*A01G 7/00* (2006.01)
*A01G 1/00* (2006.01)
*A01G 22/00* (2018.01)

(52) U.S. Cl.
CPC ............... *A01G 1/001* (2013.01); *A01G 7/00* (2013.01); *A01G 22/00* (2018.02)

(58) Field of Classification Search
CPC . A01G 1/001; A01G 7/00; A01G 7/04; A01G 7/045; A01H 3/02
(Continued)

(56) References Cited

U.S. PATENT DOCUMENTS 3,324,593 A * 6/1967 Strasser .................. A01G 7/00 47/17
3,824,736 A * 7/1974 Davis ..................... A01G 7/045 47/17

(Continued)

FOREIGN PATENT DOCUMENTS

| JP | 7-322759 | 12/1995 |
| JP | 2007-289125 | 11/2007 |

(Continued)

OTHER PUBLICATIONS

Manipulation of the Annual Growth Cycle of Blueberry Using Photoperiod; M. Pilar Banados and Bernadine Strik; Dept. of Horticulture, Oregon State University, 2006.*

(Continued)

*Primary Examiner* — Marc Burgess
*Assistant Examiner* — Ebony E Evans
(74) *Attorney, Agent, or Firm* — Greenblum & Bernstein, P.L.C.

(57) ABSTRACT

To provide a technique whereby, in cultivating a crop, factors relating to differentiation into flower buds and leaf buds, sprouting, flowering and fruiting, growth of young shoots, etc., are regulated. For example, the invention addresses the problem of regulating the growth of a crop so that leaf buds sprout in tandem and with the sprouting of flower buds and flowering and fruiting are repeated under (Continued)

fresh foliage. [Solution] A plant cultivation method which comprises environmentally stimulating a plant to regulate differentiation into flower buds and/or differentiation into leaf buds. In a typical embodiment, the plant is help in an environment at a temperature of 16-40° C. at a photoperiod of 8-13 hours immediately after harvesting fruits. As another environmental stimulus, the plant is held in, for example, an environment at a temperature of 3-7° C. As still another environmental stimulus, the plant as held in, for example, an environment at a temperature of 16-23° C. at a photoperiod of 8-11 hours.

5 Claims, 17 Drawing Sheets

(58) Field of Classification Search
USPC .................................................... 47/58.1, 65
See application file for complete search history.

(56) References Cited

U.S. PATENT DOCUMENTS

| | | | | | |
|---|---|---|---|---|---|
| 3,973,353 | A | * | 8/1976 | Dedolph | A01G 31/047 47/39 |
| 4,028,847 | A | * | 6/1977 | Davis | A01G 31/042 165/59 |
| 4,068,405 | A | * | 1/1978 | Campbell | A01G 31/045 47/65 |
| 4,337,986 | A | * | 7/1982 | Haub | F16C 13/04 384/428 |
| PP5,714 | P | * | 4/1986 | Duffett | Plt./289 |
| 4,765,092 | A | * | 8/1988 | Cline | A01C 1/02 47/61 |
| 4,897,957 | A | * | 2/1990 | Oglevee | A01H 3/02 47/58.1 R |
| 5,642,587 | A | * | 7/1997 | Janes | A01G 7/00 435/123 |
| 6,309,440 | B1 | * | 10/2001 | Yamashita | A01G 7/06 47/57.6 |
| 9,844,518 | B2 | * | 12/2017 | Lowe | A61K 31/05 |
| 2002/0026659 | A1 | * | 2/2002 | Blowers | A01C 1/00 800/298 |
| 2004/0003440 | A1 | * | 1/2004 | Anderson | A01H 3/02 800/321 |
| 2005/0193448 | A1 | * | 9/2005 | Gardner | A01H 3/02 800/306 |
| 2005/0288184 | A1 | | 12/2005 | Keim et al. | |
| 2011/0207615 | A1 | * | 8/2011 | Ovadya | A01G 1/001 506/7 |
| 2014/0250778 | A1 | * | 9/2014 | Suntych | A01G 7/045 47/1.4 |
| 2014/0259905 | A1 | * | 9/2014 | Ovadya | A01G 1/001 47/58.1 LS |

FOREIGN PATENT DOCUMENTS

| | | | |
|---|---|---|---|
| JP | 2011-120553 | 6/2011 | |
| JP | 2011-120555 | 6/2011 | |
| JP | 2011-150557 | 8/2011 | |
| JP | 2013-31439 | 2/2013 | |
| JP | 2013-34438 | 2/2013 | |
| JP | 2013-42706 | 3/2013 | |
| WO | WO-2007018252 A1 * | 2/2007 | .............. A01H 3/02 |
| WO | 2012/161351 | 11/2012 | |

OTHER PUBLICATIONS

Spann et al., "Photoperiod and Temperature Effects on Growth and Carbohydrate Storage in Southern Highbush Blueberry Interspecific Hybrid," J. Amer. Soc. Hort. Sci., vol. 129, No. 3, pp. 294-298, 2004.

Office Action issued in Singapore Patent Appl. No. 11201507724U, dated May 27, 2016.

Horiuchi et al., "Flowering and Shoot Growth Responses of Blueberry Grown Under Different Day-Lengths and Temperatures After Harvest", Horticultural Research (Japan), vol. 12, Supp. 1, p. 43, 2013.

International Search Report issued in PCT/JP2014/057716, dated Jul. 1, 2014, along with an English language translation.

Extended European Search Report issued in EP Patent Appl. No. 14776229.8, dated Oct. 10, 2016.

* cited by examiner

TOCHIOTOME" AND "AKIHIME" OF THE CONTROL GROUP AND EXAMPLE

PLANT CULTIVATION METHOD

TECHNICAL FIELD

The present invention relates to a plant cultivation technique for controlling factors involved in differentiation into flower buds and leaf buds, flowering and fruiting, leaf bud sprouting, growth of new shoots, and the like.

BACKGROUND ART

In natural conditions, blueberry plants flower in spring, the fruit thereof matures in summer, and the plants shed leaves and enter dormancy during autumn and winter.

Specifically, in temperate regions of the northern hemisphere (e.g., Tokyo), flower buds form at distal ends of new shoots (newly extended stems) or at joints (leaf axils) of upper leaves of new shoots by about September in response to shortening of days from about July after the summer solstice, shedding of leaves is completed in November when daytime air temperatures are about 10 to 15° C., and flowering in the following year occurs following dormancy. In a normal life cycle, leaf buds begin to sprout after flowers have bloomed and scattered (around April), or at the same time as flowering, leaf buds extend into leaves and stems to form new shoots, and as the new shoots grow, fruit flesh forms/matures around seeds in approximately 60 days, and harvest occurs at the beginning of summer (June). Specifically, blueberry is a deciduous fruit tree that can be harvested only once per year. The same life cycle is observed in so-called one-season-bearing fruit trees such as cherry, plum, peach, and apple.

Consequently, the harvest period for blueberries under natural conditions (sunlight only) in Japan is from June to September at best, considering a combination of varieties having different fruit maturation periods and other characteristics. Even in the case of protected cultivation using greenhouses, the harvest time is from mid-April to early June, and a hiatus in domestic harvesting and exporting of blueberries occurs from October to March of the following year (off-season). The supply of fresh blueberries is therefore insufficient for demand from October to May of the following year, and blueberries imported from Chile and other southern-hemisphere countries are expensive.

Patent Reference 1 from the present inventors discloses a cultivation method whereby harvesting even in the off-season is made possible through use of a blueberry variety having a relatively short chilling requirement of about 100 to 500 hours for breaking dormancy. The method disclosed in Patent Reference 1 includes a step for inducing flowering by placing the blueberry plant in an environment having a temperature higher than the dormancy-inducing temperature thereof after the formation of flower buds (about September under natural conditions in Tokyo), and a step for then (starting in about November) placing the blueberry plant in conditions having a longer light period than during induction of flowering. This method makes it possible to cause continuous flower bud formation/flowering/fruiting to occur while fruit is harvested throughout the off season (from December to about July of the following year in this case).

However, although the technique disclosed in Patent Reference 1 enables continuous flower bud formation, flowering, and fruiting, the amount of growth of new shoots is suppressed when large amounts of fruit are produced, leading to reduced leaf area. Fruit size is thereby reduced, and large yields cannot be expected.

Consequently, when the method of Patent Reference 1 is applied, although flowering and fruiting are repeated and the period for such reproductive growth is dramatically lengthened, vegetative growth of foliage is inadequate, and tree vigor is therefore difficult to maintain. Specifically, in a blueberry or other one-season-bearing fruit tree, sprouting of leaf buds and growth of new shoots begin at the same time as flowering or after flowers have bloomed and scattered. Therefore, in the system of Patent Reference 1 for producing repeated flowering after flowers have bloomed and scattered, the vegetative growth period for foliage until the next flowering is extremely short or almost absent. Therefore, in order to achieve more long-term continuous production of blueberries, there is a strong need for sprouting of leaf buds and growth of new shoots to be initiated together with flowering, and also for foliage to be developed. Patent References 2 and 3 disclose systems for controlling the growth environment of plants, but do not suggest methods of control capable of satisfying the above requirements.

PRIOR ART REFERENCES

Patent References

Patent Reference 1: WO 2012/161351
Patent Reference 2: Japanese Laid-open Patent Application No. 2011-120555
Patent Reference 3: Japanese Laid-open Patent Application No. 2011-150557

SUMMARY OF THE INVENTION

Problems to be Solved by the Invention

An object of the present invention is to provide a technique for controlling factors involved in differentiation into flower buds and leaf buds, sprouting, flowering and fruiting, growth of new shoots, and the like. The most interesting subject of this technique is the control of flower bud and leaf bud differentiation. The control of sprouting of flower buds and leaf buds differentiated as described above may also be included as a subject of the present invention. Preferably, in a plant to which such a technique is applied, leaf buds sprout in tandem with flower buds, and flowering and fruiting are repeated on new foliage.

Means Used to Solve the Above-Mentioned Problems

The present inventors have discovered that differentiation of flower buds and leaf buds can be controlled by specific environmental stimuli. Specifically, the present inventors have discovered that by applying the control technique of the present invention, flower bud differentiation can be further promoted, or that flower bud differentiation can instead be suppressed and priority given to leaf bud differentiation. More surprisingly, the present inventors have discovered that flower bud differentiation and leaf bud differentiation can be advanced simultaneously in a plant to which the present invention is applied. Consequently, a first aspect of the present invention is:

[1] a plant cultivation method comprising applying, to a plant, a first environmental stimulus for controlling flower bud differentiation and/or leaf bud differentiation.

The abovementioned environmental stimulus must be applied before flower buds and leaf buds are formed, but a time immediately after harvesting of fruit can be cited as an example of the preferred timing of application. Specifically, the reason for this is that in a blueberry or other one-season-bearing plant, differentiation into flower buds from the appearance of leaf primordia begins at a time substantially immediately after harvesting of fruit. Consequently, a preferred embodiment of the present invention is:

[2] the method according to aspect [1], the first environmental stimulus being applied immediately after harvesting of fruit.

The first environmental stimulus is applied by combining an air temperature of 16 to 40° C. (a midday temperature of about 40° C. and a night temperature of about 16° C.) and a day length of 8 to 13 hours. For example, when the air temperature is set to 16 to 23° C. (a midday temperature of about 23° C. and a night temperature of about 16° C.), almost all buds differentiate (convert) into flower buds. Meanwhile, when the light-period air temperature is maintained at 25° C. or higher, conversion to flower buds can be suppressed (i.e., differentiation into flower buds can be suppressed, and formation of leaf buds can be promoted). It has also been shown that by setting a day length of 12 to 13 hours in combination with the conditions described above, the ratio of leaf buds can be increased, and by setting a day length of 8 to 10 hours, flower buds can be formed in a suitable ratio. Consequently, other preferred embodiments of the present invention are:

[3] the method according to [1] or [2], the first environmental stimulus being applied by placing a plant in an environment having an air temperature of 16 to 40° C. and a day length of 8 to 13 hours;

[4] the method according to [3], the air temperature being set to 16 to 23° C., thereby promoting development of flower buds;

[5] the method according [3], the air temperature of a light period being set to 25° C. or higher, thereby increasing a differentiation rate of leaf buds in conjunction with growth of new shoots;

[6] the method according to [3], the day length being set to 12 to 13 hours, thereby increasing the ratio in which leaf buds are formed; and

[7] the method according to [3], the day length being set to 8 to 10 hours, thereby increasing the ratio of flower bud differentiation.

In a particularly preferred embodiment of the present invention, flower buds and leaf buds are formed at the same time in a good balance, leaf buds thereby sprout in tandem with flower buds, and flowering and fruiting are repeated on new foliage. Regarding a typical example of the environmental stimulus, the present invention includes:

[8] the method according to [3], the temperature of a light period being set to 25° C. or higher, and the day length being set to 8 to 10 hours.

The present inventors have also discovered a suitable environmental stimulus for controlling the sprouting time of flower buds and/or leaf buds formed as described above. A typical stimulus includes placing a plant in a low-temperature condition of about 3 to 7° C. In this stimulus, an extremely low-temperature stimulus of a temperature of about 3 to 7° C. is abruptly applied to a plant subsequent to harvesting, the plant typically having been grown at a midday temperature of 30° C. or higher and a day length of 14 hours, and differs from so-called breaking of dormancy. Specifically, a second aspect of the present invention and a preferred embodiment thereof are:

[9] the method according to any of [1] through [8], further comprising applying, to the plant, a second environmental stimulus for controlling a sprouting time for flower buds and/or leaf buds; and

[10] the method according to [9], the second environmental stimulus being applied by placing a plant in an environment having an air temperature of 3 to 7° C.

Even when a plant subjected to the first environmental stimulus or subjected to the first and second environmental stimuli in sequence is returned to natural conditions, it is conceivable that sprouting and growth of new shoots will each begin at appropriate times, and that fruiting will occur as foliage is adequately developed. However, the present invention is intended also to apply environmental conditions appropriate for sprouting and control generation of foliage and the flowering and fruiting subsequent thereto. Application of an air temperature of 16 to 23° C. (a midday temperature of about 23° C. and a night temperature of about 16° C.) and a day length of 8 to 11 hours can be cited as an example of typical environmental conditions. A third aspect of the present invention and a preferred embodiment thereof are therefore:

[11] the method according to [9] or [10], further comprising applying, to a plant, a third environmental stimulus applied by placing a plant in an environment suitable for sprouting of leaf buds, sprouting of flower buds, generation of foliage, flowering, and fruiting; and

[12] the method according to [11], the environmental stimulus comprising an air temperature of 16 to 23° C. and a day length of 8 to 11 hours.

The present invention may also be treated as a fruit production method using an environmentally variable facility such as a plant factory. Consequently, other aspects of the present invention are:

[13] a fruit production method, the method comprising:
  1) a step for placing a plant in an environment having an air temperature of 16 to 40° C. and a day length of 8 to 13 hours immediately after harvesting of fruit;
  2) a step for placing the plant in an environment having an air temperature of 3 to 7° C. after the 1) step; and
  3) a step for placing the plant in an environment having an air temperature of 16 to 23° C. and a day length of 8 to 11 hours after the 2) step; and

[14] the method according to [13], the 1) environment having a light-period temperature of 25° C. or higher and a day length of 8 to 10 hours.

Suitable durations for treatment in the aforementioned production method are described below.

[15] The method according to [13] or [14], the duration of the 1) step being 30 to 90 days, the duration of the 2) step being 15 to 45 days, and the duration of the 3) step being 15 days or greater.

Advantages of the Invention

In plant cultivation by the present invention, it is possible to appropriately control factors involved in differentiation into flower buds and leaf buds, flowering and fruiting, leaf bud sprouting, growth of new shoots, and the like. Therefore, fruit can be delivered even in the off season for outdoor cultivation or normal protected cultivation, for example. In a preferred embodiment of the present invention, leaf buds sprout in tandem with flower buds, and flowering and fruiting are repeated on new foliage. Fruit can thereby be continuously produced without loss of tree vigor.

BRIEF DESCRIPTION OF THE DRAWINGS

FIG. 1 shows sound growth of the plant body and flowering amid growth of foliage. Numerous new shoots have also already appeared.

Figure 2:

FIG. 2 Is a photograph of a bearing branch of a plant to which the environmental stimulus of Example 1 was applied. FIG. 2 shows that after sprouting of leaf buds and flower buds, foliage growth and flowering progressed simultaneously. Fruit stems are also longer than usual, and spaces are formed between flower clusters (fruits).

Figure 1:
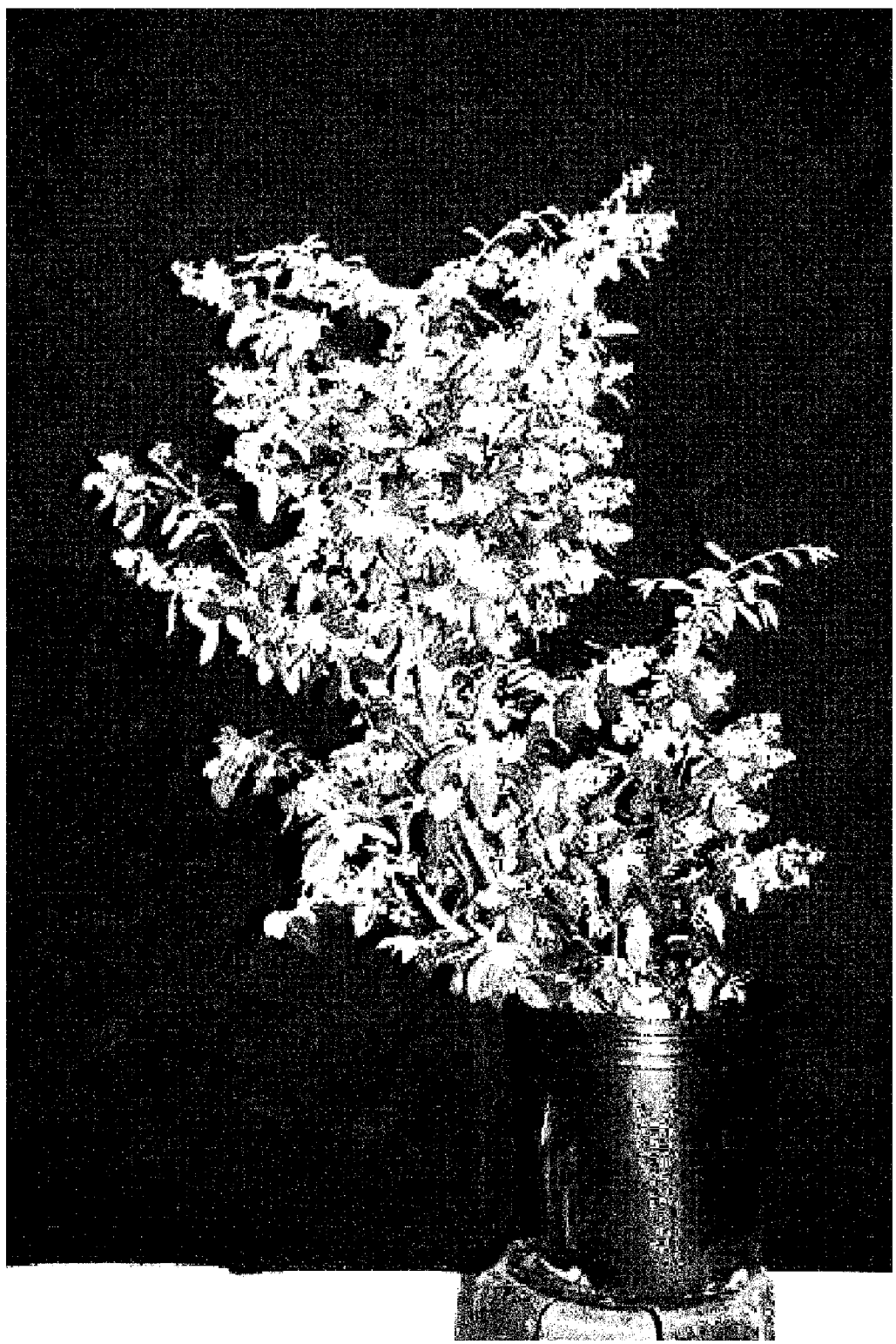
FIG. 1 Is a photograph of an entire plant to which the environmental stimulus of Example 1 was applied.
Figure 3:

FIG. 3 Is a photograph of an entire plant to which the environmental stimulus of Example 2 was applied. FIG. 1 shows sound growth of the plant body and flowering amid growth of foliage. Numerous new shoots have also already appeared.

Figure 4:

FIG. 4 Is a photograph of a bearing branch of a plant to which the environmental stimulus of Example 2 was applied. FIG. 4 shows that after sprouting of leaf buds and flower buds, foliage growth and flowering progressed simultaneously. Fruit stems are also longer than usual, and spaces are formed between flower clusters (fruits).

Figure 5:

FIG. 5 Is a photograph of an entire plant to which the environmental stimulus of Example 3 was applied. The plant is fruiting, but new shoots are not observed.

Figure 6:

FIG. 6 Is a photograph of a bearing branch of a plant to which the environmental stimulus of Example 3 was applied. Vigorous fruiting is observed.

Figure 7:

FIG. 7 Is a photograph of an entire plant to which the environmental stimulus of Reference Example 1 was applied. New shoots have appeared, but flowering is not observed.

Figure 8:

FIG. 8 Is a photograph of a bearing branch of a plant to which the environmental stimulus of Reference Example 1 was applied. Flowering is not observed.

Figure 9:
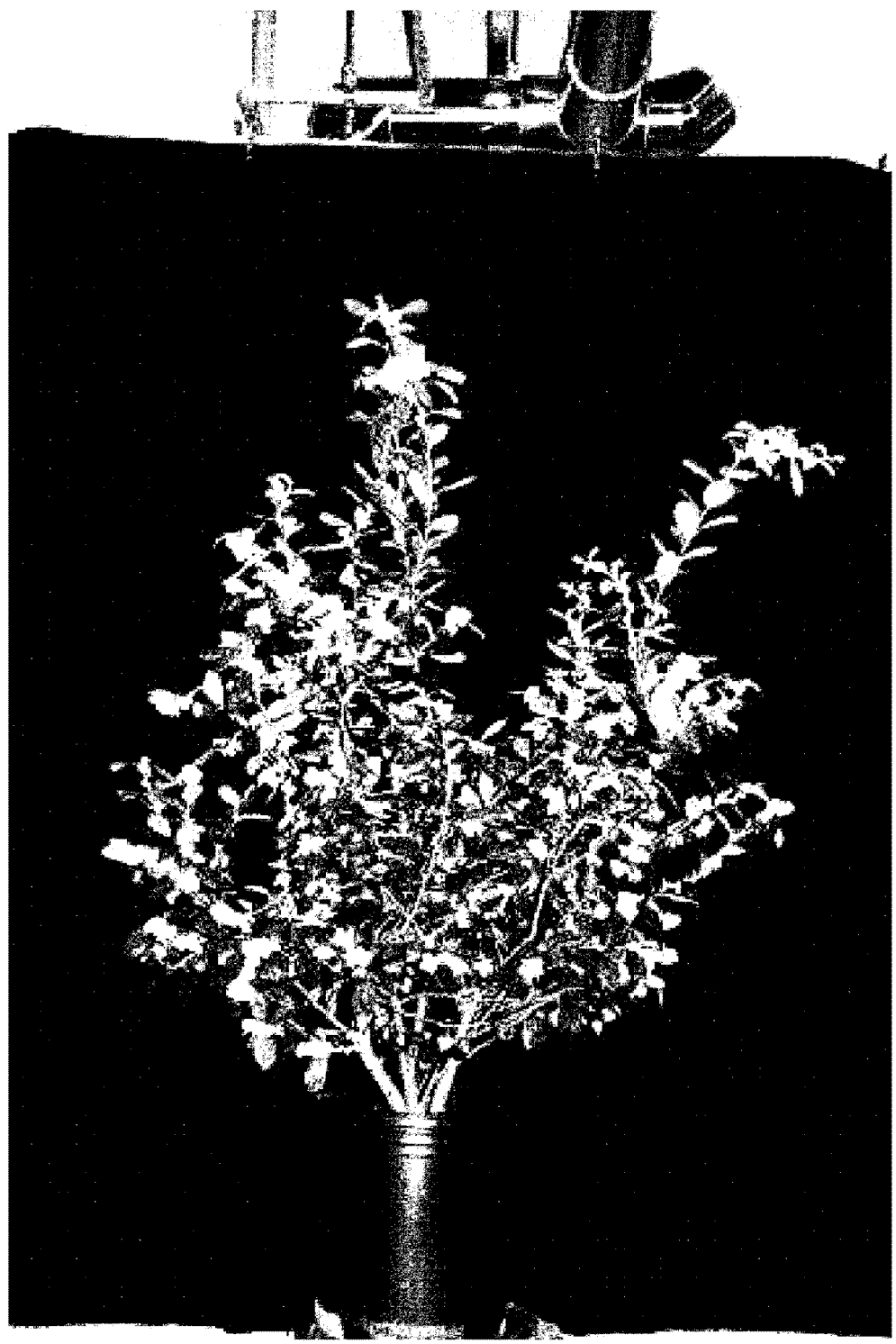

FIG. 9 Is a photograph of an entire plant to which the environmental stimulus of Reference Example 2 was applied. Flowering is present, but foliage growth is not observed.

Figure 10:
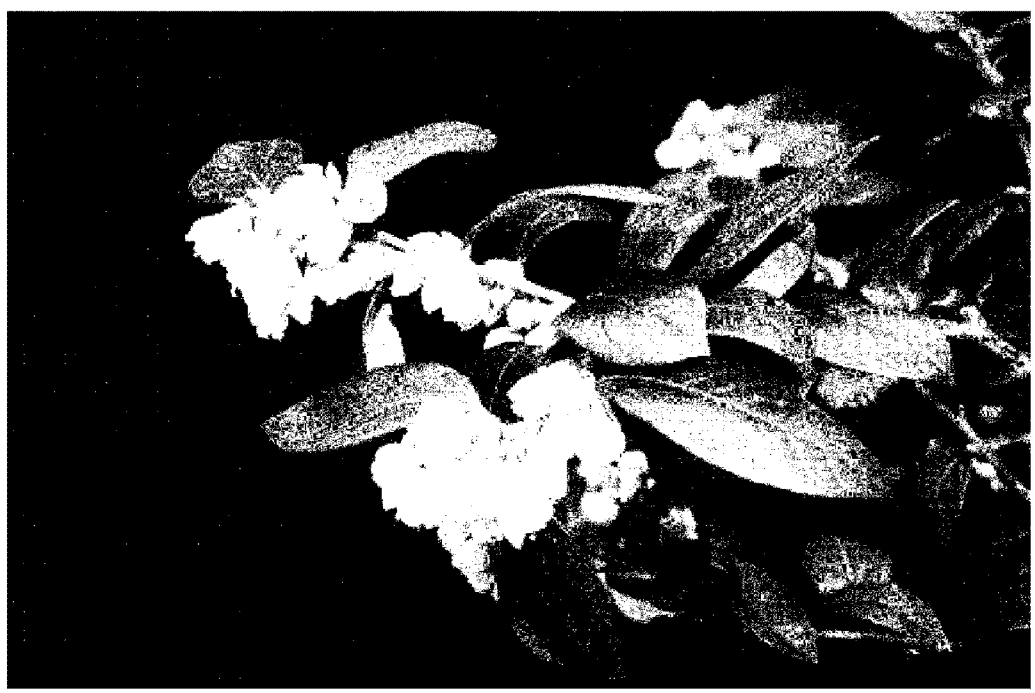

FIG. 10 Is a photograph of a bearing branch of a plant to which the environmental stimulus of Reference Example 2 was applied. Vigorous flowering is present, but sprouting of leaf buds is not observed.

Figure 11:

FIG. 11 Is a photograph of an entire plant to which the environmental stimulus of Comparative Example 1 was applied. Neither flowering nor new shoots are observed.

Figure 12:
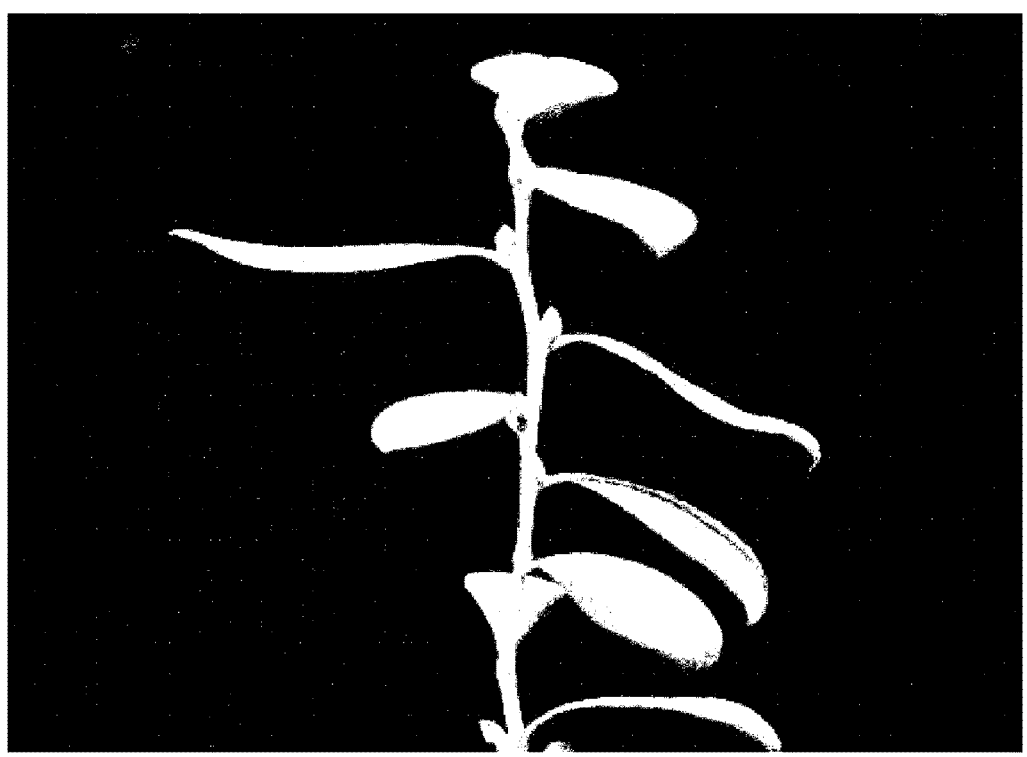

FIG. 12 Is a photograph of a bearing branch of a plant to which the environmental stimulus of Comparative Example 1 was applied. Buds have grown large.

Figure 13:

FIG. 13 Is a photograph of an entire plant to which the environmental stimulus of Comparative Example 2 was applied. Spindly branch growth and flowering/fruiting are present, but new shoots have not appeared.

Figure 14:

FIG. 14 Is a photograph of a bearing branch of a plant to which the environmental stimulus of Comparative Example 2 was applied. New shoots have not appeared.

Figure 15:

FIG. 15 Is a photograph of the entire plant of Comparative Example 3 (under natural conditions). All leaves have turned red.

Figure 16:

FIG. 16 Is a photograph of a bearing branch of the plant of Comparative Example 3 (under natural conditions). All leaves have turned red.

Figure 17:
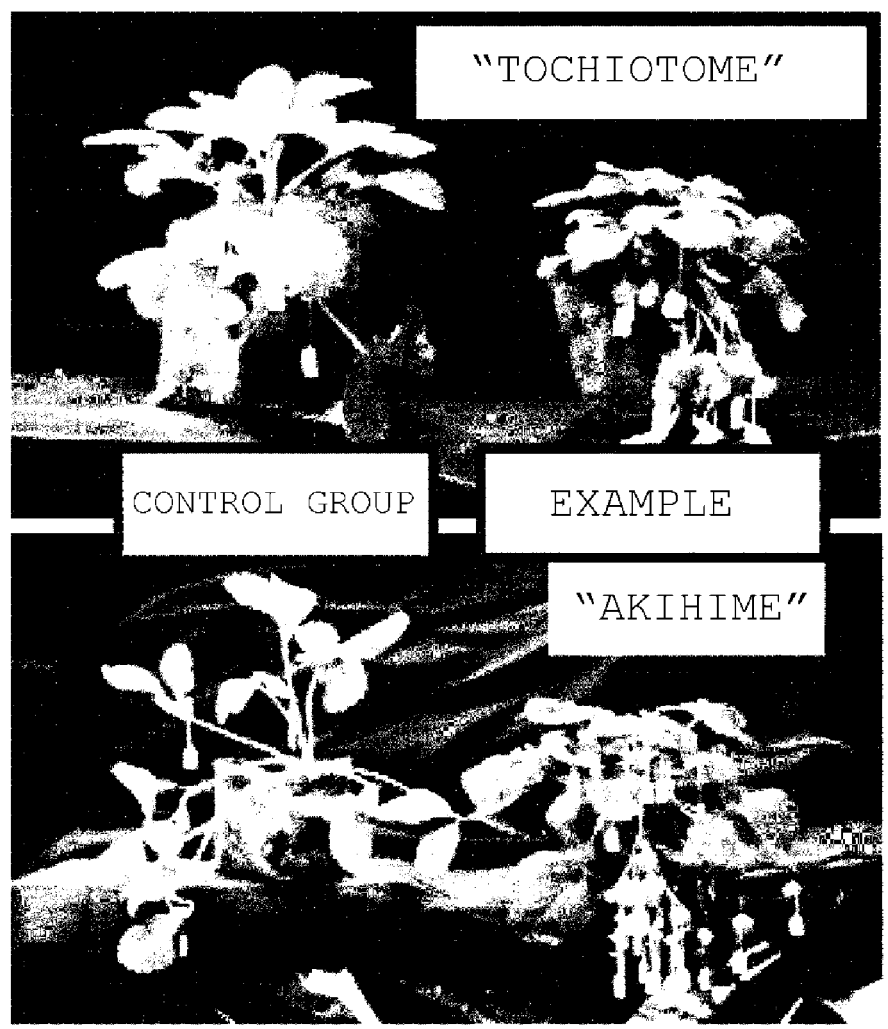

FIG. 17 Is a photograph of an entire plant to which the environmental stimulus of Example 4 was applied. FIG. 17 shows sound growth of the plant body of Example 4 in comparison with controls, and fruiting is continued.

BEST MODE FOR CARRYING OUT THE INVENTION

In the present specification, "factors involved in flower bud differentiation, leaf bud differentiation, flowering, sprouting, dormancy, and the like" are factors causing reception of stimuli from the outside environment by plant organs, tissues, or cells, and the resultant signal transduction and expression of specific genes. Consequently, in the present specification, to control these factors means to subject a plant individual to stimuli from the outside environment thereof, particularly to air temperature, day length, and other environmental stimuli. However, the environmental stimuli of the present invention to which plant individuals are subjected also include stimuli which could not be encountered by the plant individuals in the wild, and are used as appropriate.

First Environmental Stimulus (or First Step)

In the present invention, a first environmental stimulus for controlling flower bud differentiation and/or leaf bud differentiation is applied to a plant. In other words, the stimulus must be applied at least before flower bud differentiation is completed. More precisely, the stimulus must be applied before a leaf primordium converts to a flower bud. A leaf primordium that does not convert (differentiate) to a flower bud differentiates to a leaf bud.

Despite seasonal differences according to plant species or variety, many one-season-bearing fruit trees form flower buds from leaf primordia of apical buds or axillary buds at harvest time, i.e., when fruit is mature. In the case of blueberries, for which harvest time begins about June in the climate of Tokyo, leaf primordia at the tops of apical buds and axillary buds differentiate into flower buds by about October from about early July when harvesting is ended. Consequently, in this case, the first environmental stimulus of the present invention must be applied to a plant before September at the latest. For example, the first environmental stimulus of the present invention can be shown to be applied to plants starting immediately after fruit harvest at any time from early July to early August (i.e., within about one month). Although it is also possible to apply the first environmental stimulus of the present invention starting before fruit harvest or during harvest time, out of concern for decreased yield when an extremely short daytime condition or the like is selected as the first environmental stimulus, it is probably not necessary to change the environment before harvest is completed.

The first environmental stimulus of the present invention is applied by a combination of an air temperature in the range of 16 to 40° C. and a light period in the range of a day length of 8 to 13 hours. Applying the environmental stimulus in the abovementioned ranges to a plant immediately after harvest can promote differentiation of leaf primordia into flower buds and/or leaf buds. For example, when the air temperature is set to approximately 16 to 23° C. and the day length to 8 to 10 hours, almost all buds convert (differentiate) to flower buds. Meanwhile, conversion to flower buds is suppressed when the light-period air temperature is approximately 25° C. or higher and the day length is maintained at about 12 to 13 hours, and as a result, leaf bud formation can be promoted.

The ratio of leaf buds can be increased when the day length is set to approximately 12 to 13 hours in combination with the air temperature condition described above, and flower buds can be formed in a suitable ratio when the day length is set to approximately 8 to 10 hours. Consequently, in a particularly preferred embodiment of the present invention, flower buds and leaf buds are formed at the same time in a good balance, leaf buds thereby sprout in tandem with flower buds, and flowering and fruiting are repeated on new foliage. A typical example of the environmental stimulus is a combination of a light-period temperature of 25° C. or higher and a day length of 8 to 10 hours.

The present inventors are unaware of any reported instances of flower buds and leaf buds differentiating at the same time and flowering and new shoot growth occurring simultaneously as in the present invention in a blueberry plant placed in a conventional protected horticultural environment under ordinary natural conditions. Specifically, it is reasonable to infer that the first environmental stimulus of the present invention produces plant physiological and molecular biological changes not obtainable under ordinary environmental conditions.

Although the present invention is not bound to any particular theory of operation, in comparison with the Tokyo early summer (i.e., immediately after harvest) day length of approximately 14 hours or more, the day length of 12 to 13 hours of the first environmental stimulus of the present invention corresponds to an autumn of sorts (around September and later). Particularly when the day length is about 8 to 10 hours, such a day length corresponds to late autumn (around November and later). Consequently, the first environmental stimulus of the present invention can be considered to change the growth environment of the plant non-continuously and at once. The combination of a light-period temperature of 25° C. or higher and a day length of 8 to 10 hours as an embodiment of the first environmental stimulus is also cannot normally occur under natural conditions. Specifically, an environment of high temperature and short days does not occur at any time of year in the temperate region in which blueberries and the like naturally grow. From this perspective as well, such an embodiment of the present invention whereby it is possible to cause differentiation of flower buds and leaf buds at the same time (i.e., it is possible to suppress conversion of all leaf primordia into flower buds) is deemed capable of applying significant stress to a plant.

The unusual physiological and molecular biological change indicated by simultaneous differentiation into flower buds and leaf buds may possibly occur in response to such a stress factor as described above, which cannot occur under natural conditions. In this regard, the modern climate is relatively stable from the perspective of plant evolutionary history, while the ancient environment was harsh. Consequently, the present inventors have reasoned that although plants were originally provided with the ability to immediately begin reproductive growth and vegetative growth upon settling of environmental conditions, as a result of adaptation to the modern stable change of seasons, or for such reasons as having been artificially selected for the sake of constancy of harvest time, the cultivated plants of today simply do not manifest such characteristics.

In any case, bud differentiation can be promoted by the first environmental stimulus of the present invention, i.e., by an air temperature and day length combination in the range of an air temperature of 16 to 40° C. and a day length of 8 to 13 hours.

The air temperature condition described above for the first environmental stimulus can be realized using various types of temperature control devices singly or in combinations thereof, such as heaters, air-cooling equipment, ventilation, (de)humidifiers, ventilating fans, dry mist, and shading curtains. A closed-system chamber including these temperature control devices or an ordinary greenhouse provided with the temperature control devices may be used for this purpose. Suitable examples of such a facility are disclosed in Japanese Laid-open Patent Applications 2011-120555 and 2011-150557.

The term "light period" which constitutes "day length" in the environmental stimuli of the present invention refers to a continuous time period (hours) for which a plant is placed in a light intensity condition under which photosynthesis is possible. A light intensity (photosynthetic photon flux density (PPFD)) in the range of approximately 100 to 1000 $\mu mol \cdot m^{-2} \cdot s^{-1}$ PPFD, preferably 700 to 800 $\mu mol \cdot m^{-2} \cdot s^{-1}$ PPFD, can be cited as an example of a light intensity condition under which photosynthesis is possible. The primary wavelength (spectral energy accounting for the majority) of the light radiated in the light period is not particularly limited, but a wavelength in the range of approximately 400 to 730 nm is suitable. Consequently, the light radiated in the light period for the day length condition of the first environmental stimulus may be sunlight (natural light), artificial light, or both. Specifically, the source of the light radiated in the light period is not particularly limited, and may, of course, be the Sun, or a high-pressure sodium lamp, a metal halide lamp, a light-emitting diode (LED), a laser light source, or the like. A single light source may be used, or an appropriate combination of a plurality of light sources may be used. When the intensity of natural light falls below the abovementioned range, such as during rainy weather or cloudy skies, for example, supplemental lighting is preferred. The light intensity is preferably adjusted using shading curtains or the like when the intensity of natural light exceeds the abovementioned range, such as on extremely hot midsummer days. Suitable facilities for controlling the day length condition of the first environmental stimulus of the present invention are also disclosed in Japanese Laid-open Patent Applications 2011-120555 and 2011-150557.

The time period for which the first environmental stimulus is applied to a plant may be approximately 30 days to 90 days, for example. A period of about 30 days is adequate for controlling flower bud differentiation and/or leaf bud differentiation. Although the upper limit of this period is not particularly limited from the perspective of bud differentiation, from the perspective of enabling off-season harvesting, there is no need to make the period longer than necessary. When new shoots are formed, the period until the new shoots are adequately grown can be cited as an example of a criterion for the upper limit. The meaning of one day in the present specification is the unit composed of one light period and one dark period. Specifically, when the sum of one light period and one dark period is 24 hours, 24 hours constitutes one day. Unless otherwise specified in the present specification, 24 hours corresponds to one day.

While the first environmental stimulus is being applied, relative humidity, $CO_2$ concentration, soil pH, soil electric conductivity (EC) (whereby fertilizer concentration can be estimated), and various other parameters are preferably adjusted in ranges appropriate for plant growth. For example, the relative humidity is preferably in the range of approximately 30 to 80%, the $CO_2$ concentration is preferably in the range of approximately 400 to 600 $\mu mol \cdot mol^{-1}$, the soil pH is preferably in the range of approximately 5.0 to 6.0, and the soil EC is preferably in the range of approximately 0.7 to 1.2.

Second Environmental Stimulus (or Second Step)

The second environmental stimulus of the present invention is also a stimulus for changing the growth environment of a plant non-continuously and at once. Specifically, this stimulus suddenly changes the growth environment of a plant to an extremely low temperature, the growth environment typically including a day length of 14 hours and a midday temperature of 30° C. or higher before application of the environmental stimulus. The purpose of applying the second environmental stimulus of the present invention to a plant is not the same as that of a so-called breaking of dormancy. Specifically, blueberries or cherry, peach, plum, and other deciduous trees have a dormant stage, and must be exposed to low temperature for a certain time period to break dormancy. This characteristic is called a chilling requirement, and poor sprouting occurs when the chilling requirement is not satisfied. However, the present inventors have discovered that the second environmental stimulus of the present invention makes it possible to control the sprouting time for flower buds and/or leaf buds independently of chilling requirements.

Consequently, the second environmental stimulus of the present invention can naturally be applied separately from the first environmental stimulus of the present invention as desired, and application of the second environmental stimulus to a plant subjected to the first environmental stimulus of the present invention is a preferred aspect of the present invention. Specifically, when a plant is left in a state of application of the first environmental stimulus, neither flower budding, leaf budding, nor sprouting occurs even after a period of 100 days has elapsed. Meanwhile, although sprouting also is anticipated to occur spontaneously as soon as the dormancy requirement is satisfied even when the plant is returned to a natural environment, for example, after being subjected to the first environmental stimulus, the second environmental stimulus of the present invention should be applied at the desired time in order to obtain more deliberate flowering, fruiting, and harvest. For example, the second environmental stimulus is applied immediately after application of the first environmental stimulus.

Consequently, the second environmental stimulus of the present invention can be applied by placing a plant in a low-temperature environment. Specifically, the plant is placed in an environment having an air temperature of 3 to 7° C., for example. Such an air temperature condition can be considered to correspond to the coldest period of weather in Tokyo.

When the time period for which the second environmental stimulus of the present invention is applied is too short, the number of bearing branches that sprout leaf buds is small, and the number of bearing branches having only flowers increases. It was also discovered that when the time period of the second environmental stimulus is too long, the number of leaf bud sprouts or the amount of new shoot growth increases, and the number of flower clusters decreases. From the perspective of maintaining an appropriate ratio of leaf buds and flower buds, the time period for which the second environmental stimulus of the present invention is applied to plants is preferably approximately 15 days to 45 days, and more preferably approximately 30 days.

The method and facility for applying the second environmental stimulus of the present invention are the same as described for the first environmental stimulus of the present invention. The day length is not particularly limited, but the second environmental stimulus is preferably applied only in a dark period.

Third Environmental Stimulus (or Third Step)

The third environmental stimulus of the present invention is for generating foliage and causing the flowering/fruiting subsequent thereto in an environment appropriate for sprouting of both leaf buds and flower buds. Specifically, after the first and second environmental stimuli are applied, the plant is placed in conditions of an air temperature of approximately 16 to 23° C. and a day length of approximately 10 to 11 hours, and sprouting is promoted. In a blueberry plant subjected to the first and second environmental stimuli of the present invention, leaf buds sprout and foliage develops in axillary buds of bearing branches typically about 15 to 30 days from the third environmental stimulus of the present invention. Flowering occurs in a blueberry plant subjected to the third environmental stimulus of the present invention in about 30 to 60 days at apical buds of bearing branches and in several buds below the apical buds.

The timing for applying the third environmental stimulus of the present invention to a plant is not particularly limited insofar as the timing is after the first and second environmental stimuli, but the third environmental stimulus of the present invention should, of course, be applied at an appropriate time from the perspective of obtaining more deliberate flowering, fruiting, and harvest. The third environmental stimulus is applied immediately after application of the second environmental stimulus, for example. The third environmental stimulus of the present invention can also be considered to correspond to a Tokyo autumn weather condition. The method and facility for applying the third environmental stimulus of the present invention are the same as described for the first environmental stimulus of the present invention.

Subject Plant

The present invention is suitable for application to so-called one-season-bearing blueberries, cherries, peaches, plums, apples, and the like. However, as described in the examples below, applying the environmental stimuli of the present invention also enables continuous flowering/fruiting cultivation while developing foliage in summer in a strawberry rootstock after the end of harvest. Consequently, raspberries and the like can also be included as plants to which the present invention can be applied.

The description above is sufficient for a person skilled in the art to implement the present invention. Examples are given below for the purpose of further description, and the present invention is therefore not limited to the described examples.

EXAMPLES

Materials and Methods

<Test Plant> The "Misty" variety of Southern Highbush blueberry was used. Plants were planted in pots and grown in the natural environment of Fuchu City, Tokyo (outdoors in Tokyo) until the start of experimentation.

<Experiment Facility> In order to apply the first through third environmental stimuli of the present invention to the plant, a glass chamber or an artificial-light-type closed-environment chamber in the Advanced Plant Factory Research Center at Tokyo University of Agriculture and Technology having a facility corresponding to the system disclosed in Japanese Laid-open Patent Application 2011-120555 or 2011-150557 was used.

<Environmental Conditions> The glass chamber or artificial-light-type closed-environment chamber described above was set to the air temperature and day length conditions described below.

I. First Environmental Stimulus

1-A) The day length in the glass chamber was set to 8 hours, the air temperature for light periods was set to 25 to 30° C., and the air temperature for dark periods was set to 15 to 20° C. The air temperature for light periods was set so as to be no lower than 25° C. The chamber set to this environment is referred to below as <Chamber 1A>.

1-B) The day length in the artificial-light-type closed-environment chamber was set to 8 hours, the air temperature for light periods was set to 25 to 28° C., and the air temperature for dark periods was set to 16 to 18° C. The $CO_2$ concentration in the chamber was 0.04 to 0.08%, and the relative humidity was 50 to 90%. The chamber set to this environment is referred to below as <Chamber 1B>.

II. Second Environmental Stimulus

The day length in the artificial-light-type closed-environment chamber was set to 0 hours, and the air temperature was set to 3 to 7° C. The $CO_2$ concentration in the chamber was 0.04 to 0.08%, and the relative humidity was 70 to 100%. The chamber set to this environment is referred to below as <Chamber 2>.

III. Third Environmental Stimulus

The day length in the artificial-light-type closed-environment chamber was set to 8 to 11 hours, the air temperature for light periods was set to 21 to 26° C., and the air temperature for dark periods was set to 14 to 16° C. The $CO_2$ concentration in the chamber was 0.04 to 0.08%, and the relative humidity was 50 to 90%. The chamber set to this environment is referred to below as <Chamber 3>.

IV. Other Environmental Treatments

The day length in the glass chamber was set to 14 hours, the air temperature for light periods was set to 25 to 32° C., and the air temperature for dark periods was set to 18 to 25° C. The chamber set to this environment is referred to below as <Chamber 4>.

Example 1

Test plants were moved to <Chamber 1A> in early July (day length: 14 hours; highest air temperature: about 28° C.; lowest air temperature: about 20° C.) immediately after harvesting of the fruit thereof, and the test plants were then grown therein for 67 days. The plants were then immediately moved to <Chamber 2> and grown therein for 30 days. The plants were then immediately moved to <Chamber 3>.

The growth status of the plants after the treatments described above is illustrated in FIGS. 1 and 2. From observation in the period of September to December, the appearance of new shoots in mid-November, and flowering in early December were confirmed. More specifically, the appearance of new shoots from base parts of bearing basal branches was observed, followed by flowering from buds at distal ends of bearing basal branches.

Furthermore, not only did the tree as a whole grow soundly, but fruit stems thereof were long. Spaces were thereby formed between fruits, making long stems a preferred characteristic for ease of harvesting. The peduncles and rachises of flowers attached in flower clusters were longer than those occurring in natural conditions, and transformation of florets into leaves was observed.

Example 2

Test plants were moved to <Chamber 1A> in late August (day length: 13 hours; highest air temperature: about 30° C.; lowest air temperature: about 20° C.) immediately after harvesting of the fruit thereof, and the test plants were then grown therein for 30 days. The plants were then immediately moved to <Chamber 2> and grown therein for 45 days. The plants were then immediately moved to <Chamber 3>.

The growth status of the plants after the treatments described above is illustrated in FIGS. 3 and 4. From observation in the period of September to December, the appearance of new shoots and flowering were confirmed. More specifically, the appearance of new shoots from base parts of bearing basal branches was observed, followed by flowering from buds at distal ends of bearing basal branches.

Example 3

Test plants were moved to <Chamber 1B> in early July immediately after harvesting of the fruit thereof, and the test plants were then grown therein for 80 days, whereupon flowering was observed from axillary buds of distal ends and top parts of all new shoots. The test plants were pollinated by bumblebees, and normal fruit matured and was harvested beginning in early December.

The growth status of the plant after the treatments described above is illustrated in FIGS. 5 and 6. As described above, from observation in the period of September to December, flowering occurred from about late September, and it was possible to begin harvesting in early December. New shoots began appearing in mid-December.

Reference Example 1

Reference Example 1 is of a case in which test plants were moved to <Chamber 2> in late August (day length: 13 hours; highest air temperature: about 30° C.; lowest air temperature: about 20° C.) after formation of flower buds and grown therein for 60 days, then immediately moved to <Chamber 3> and grown therein for 60 days.

In this condition, flowering was absent on all bearing basal branches, and only new shoots occurred. New shoots appeared beginning in early November (see FIGS. 7 and 8).

Reference Example 2

Reference Example 2 is of a case in which test plants were moved to <Chamber 1B> in late August after formation of flower buds and grown therein for 120 days.

In this condition, flowering occurred in late November, but growth of foliage was not observed, and leaves appeared after maturing of fruit (see FIGS. 9 and 10).

Comparative Example 1

Comparative Example 1 is of a case in which test plants were moved to <Chamber 1A> in late August after formation of flower buds and grown therein for 120 days.

In this condition, flowering and the appearance of new shoots were not observed, but buds were of a larger size than those occurring under natural conditions, and flowering occurred after 150 days (see FIGS. 11 and 12).

Comparative Example 2

Comparative Example 2 is of a case in which test plants were moved to <Chamber 4> in early July immediately after harvesting of fruit from the test plant, and the test plants were grown in <Chamber 4> for 140 days.

In this condition, after flowering/fruiting was observed at apical buds of branches exhibiting spindly growth in about mid-October, flowering gradually progressed toward the base part, and flowering/fruiting occurred also on bearing basal branches. However, new shoots did not appear (see FIGS. 13 and 14).

Comparative Example 3

Comparative Example 3 is of a case in which test plants were grown in natural conditions (see FIGS. 15 and 16). All leaves turned red.

Example 4

Example 4 shows the results of applying the present invention to other plants. The strawberry varieties "Tochiotome" and "Akihime" were used as test plants. The plants were planted in pots and force-cultivated in a glass chamber in Fuchu City, Tokyo until the start of experimentation.

Test plants were moved to <Chamber 3> in early May immediately after harvesting of the fruit thereof, and the test plants were then grown therein for 195 days. Cultivation of plants was continued in the glass chamber for comparison.

The growth status of the plants after the treatments described above is illustrated in FIG. 17. During the period described above, budding stopped in June to July in control-group individuals, but continuous budding was observed throughout the period in example individuals.

For the examples, the yield per rootstock during the period was five to eight times that of the control group.

INDUSTRIAL APPLICABILITY

The present invention is useful as a technique for freely controlling the time of flowering and foliage growth in crop cultivation. The present invention can therefore be used in agriculture-related fields.

The invention claimed is:

1. A plant cultivation method comprising:
    applying, to a blueberry plant, a first environmental stimulus for controlling flower bud differentiation and/or leaf bud differentiation, the first environmental stimulus comprising:
        placing the plant in an environment having light and dark periods, wherein a duration of each light period is 8 to 10 hours, the temperature during each light period is 25 to 40° C., and the temperature during each dark period is 16 to 40° C.; and
    applying, to the plant, a second environmental stimulus for controlling a sprouting time for flower buds and/or leaf buds, the second environmental stimulus comprising:
        placing the plant in an environment of continuous dark period having an air temperature of 3 to 7° C. for 15 to 45 days.

2. The method according to claim 1, said first environmental stimulus being applied immediately after harvesting of fruit.

3. The method according to claim 1, further comprising applying, to the blueberry plant, a third environmental stimulus comprising: placing the plant in an environment suitable for sprouting of leaf buds, sprouting of flower buds, generation of foliage, flowering, and fruiting, the environment having an air temperature during light and dark periods of 16 to 23° C., wherein a duration of each light period is 8 to 11 hours.

4. A fruit production method, said method comprising:
    step 1) immediately after harvesting fruit from a blueberry plant, placing the plant in an environment having light and dark periods, wherein a duration of each light period is 8 to 10 hours, the temperature during each light period is 25 to 40° C., and the temperature during each dark period is 16 to 40° C.; and
    step 2) after step 1), placing the plant in an environment of continuous dark period of 15 to 45 days having an air temperature of 3 to 7° C.; and
    step 3) after step 2), placing the plant in an environment having an air temperature during light and dark periods of 16 to 23° C., wherein a duration of each light period is 8 to 11 hours.

5. The method according to claim 4, the duration of step 1) being 30 to 90 days, and the duration of step 3) being 15 days or greater.

* * * * *